US012381362B2

(12) United States Patent
Lin et al.

(10) Patent No.: US 12,381,362 B2
(45) Date of Patent: Aug. 5, 2025

(54) ELECTRICAL CONNECTOR WITH HIGH-FREQUENCY SIGNAL TRANSMISSION

(71) Applicant: Cheng Uei Precision Industry Co., LTD., New Taipei (TW)

(72) Inventors: Pei-Yi Lin, New Taipei (TW); Yu-Hung Su, New Taipei (TW); Sheng-Yuan Huang, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 335 days.

(21) Appl. No.: 18/130,900

(22) Filed: Apr. 4, 2023

(65) Prior Publication Data

US 2023/0402801 A1 Dec. 14, 2023

(30) Foreign Application Priority Data

Jun. 14, 2022 (CN) ......................... 202221483292.5

(51) Int. Cl.
*H01R 13/6597* (2011.01)
*H01R 13/6471* (2011.01)
*H01R 13/516* (2006.01)
*H01R 13/6585* (2011.01)
*H01R 24/60* (2011.01)

(52) U.S. Cl.
CPC ..... *H01R 13/6597* (2013.01); *H01R 13/6471* (2013.01); *H01R 13/516* (2013.01); *H01R 13/6585* (2013.01); *H01R 24/60* (2013.01)

(58) Field of Classification Search
CPC H01R 12/722; H01R 12/724; H01R 13/6597; H01R 13/6585; H01R 13/6591; H01R 13/6594
USPC ............ 439/607.27, 607.28, 607.34, 607.36, 439/607.54
See application file for complete search history.

(56) References Cited

U.S. PATENT DOCUMENTS

| | | | | |
|---|---|---|---|---|
| 9,160,098 | B1 * | 10/2015 | Liao | H01R 13/5202 |
| 9,214,766 | B1 * | 12/2015 | Yu | H01R 24/60 |
| 9,425,560 | B1 * | 8/2016 | Su | H01R 13/506 |
| 9,455,535 | B1 * | 9/2016 | Chiang | H01R 13/6581 |
| 9,461,378 | B1 * | 10/2016 | Chen | H01R 12/716 |

(Continued)

FOREIGN PATENT DOCUMENTS

TW M581318 U * 7/2019

*Primary Examiner* — Marcus E Harcum
(74) *Attorney, Agent, or Firm* — Cheng-Ju Chiang

(57) ABSTRACT

An electrical connector includes an insulating housing, an upper terminal assembly fastened in the insulating housing, a center grounding plate fastened in the insulating housing, and an outer shell disposed to a top surface of the insulating housing. A rear end of the insulating housing has two first penetrating grooves. The upper terminal assembly includes an upper base portion. A rear end of the upper base portion defines two second penetrating grooves. The two second penetrating grooves are aligned with the two first penetrating grooves. Two opposite sides of a rear end of a top surface of the outer shell extend towards the insulating housing to form two elastic arms, respectively. The two elastic arms pass through the two first penetrating grooves and the two second penetrating grooves, and then the two elastic arms contact with two outermost upper grounding terminals of the upper terminal assembly.

20 Claims, 11 Drawing Sheets

(56) References Cited

U.S. PATENT DOCUMENTS 9,496,657 B1 * 11/2016 Chang ................ H01R 13/6471
9,525,241 B1 * 12/2016 Su ...................... H01R 13/6582
9,525,243 B1 * 12/2016 Yuan .................. H01R 13/6585
9,590,364 B1 * 3/2017 Chang ................ H01R 13/6581
9,653,850 B1 * 5/2017 Su ........................ H01R 13/405
9,653,851 B1 * 5/2017 Yuan .................. H01R 13/6594
9,722,342 B2 * 8/2017 Yuan .................... H01R 13/428
9,768,545 B1 * 9/2017 Hsu .................... H01R 13/6585
9,997,866 B1 * 6/2018 Hsu .................... H01R 13/5202
10,116,100 B2 * 10/2018 Feng .................. H01R 13/6585
10,320,126 B2 * 6/2019 Ju ...................... H01R 13/6583
10,396,499 B1 * 8/2019 Shen .................. H01R 13/6594
10,720,739 B1 * 7/2020 Wu .................... H01R 13/6585
11,289,856 B1 * 3/2022 Teng .................. H01R 13/6581
11,545,792 B2 * 1/2023 Chang ................ H01R 13/6597
2010/0075542 A1 * 3/2010 Ho ..................... H01R 13/4367
439/660
2014/0024257 A1 * 1/2014 Castillo .............. H01R 13/6585
439/607.05
2015/0064979 A1 * 3/2015 Yang ...................... H01R 24/60
439/676
2015/0200501 A1 * 7/2015 Yang ...................... H01R 24/60
439/676
2016/0087378 A1 * 3/2016 Chen .................. H01R 13/6597
439/607.34
2016/0149350 A1 * 5/2016 Kao ..................... H01R 12/724
439/607.05
2016/0233629 A1 * 8/2016 Yen ........................ H01R 24/60
2016/0285209 A1 * 9/2016 Peng .................... H01R 13/506
2016/0315422 A1 * 10/2016 Cheng ................ H01R 13/6585
2016/0322759 A1 * 11/2016 Park ................... H01R 13/6595
2016/0344142 A1 * 11/2016 Zhao .................. H01R 13/6588
2016/0352050 A1 * 12/2016 Hu ....................... H01R 13/652
2016/0352052 A1 * 12/2016 Yu ...................... H01R 13/6585
2017/0033507 A1 * 2/2017 Tsai ....................... H01R 24/62
2017/0070013 A1 * 3/2017 Hsu .................... H01R 13/6585
2017/0077651 A1 * 3/2017 Chang ................ H01R 13/6596
2017/0085040 A1 * 3/2017 Tsai ................... H01R 13/6596
2017/0149172 A1 * 5/2017 Nishikata ............... H01R 24/60
2017/0271820 A1 * 9/2017 Ho ..................... H01R 13/6585
2017/0288326 A1 * 10/2017 Wang ................... H01R 12/775
2017/0331229 A1 * 11/2017 Cheng .................... H01R 24/60
2017/0338576 A1 * 11/2017 Sato ..................... H01R 13/405
2018/0166830 A1 * 6/2018 Feng .................. H01R 13/6596
2018/0198246 A1 * 7/2018 Cheng .................... H01R 24/60
2018/0212366 A1 * 7/2018 Chang .................. H01R 13/405
2018/0233859 A1 * 8/2018 Wu .................... H01R 13/5045
2019/0199038 A1 * 6/2019 Zhou .................... H01R 13/405
2019/0229481 A1 * 7/2019 Zhao ...................... H01R 43/24
2019/0288465 A1 * 9/2019 Little ..................... H01R 24/60
2021/0119384 A1 * 4/2021 Kawasaki .......... H01R 13/6474
2022/0085556 A1 * 3/2022 Teng .................. H01R 13/6581
2022/0123510 A1 * 4/2022 Li ...................... H01R 13/6592
2023/0283025 A1 * 9/2023 Lin .................... H01R 13/6597
439/634

* cited by examiner

ELECTRICAL CONNECTOR WITH HIGH-FREQUENCY SIGNAL TRANSMISSION

CROSS-REFERENCE TO RELATED APPLICATION

The present application is based on, and claims priority from, China Patent Application No. 202221483292.5, filed Jun. 14, 2022, the disclosure of which is hereby incorporated by reference herein in its entirety.

BACKGROUND OF THE INVENTION

1. Field of the Invention

The present invention generally relates to an electrical connector, and more particularly to an electrical connector improving a high-frequency signal transmission.

2. The Related Art

In various connector types which are frequently used by various electronic products, universal serial bus (USB) connectors are the most widely applied. With the improvement of sciences and technologies, kinds of the universal serial bus connectors are more and more, such as USB 2.0, USB 3.0, Micro USB, Mini USB or USB TYPE-C. The USB TYPE-C connectors have been widely applied in the various electronic products. The USB TYPE-C connectors have already reached a 40 Gbps transmission specification.

When high-frequency signals are transmitted, an internal structure of an electrical connector makes an electromagnetic field and generates a resonance, a high-frequency characteristic is particularly poor in a certain frequency band, and an impedance is mismatched, so an insertion loss and a return loss of the signals become worse to affect crosstalk results. When the high-frequency signals are transmitted, the above-mentioned phenomenon will be more serious, so that signal transmission quality of the electrical connector is further affected.

Thus, it is essential to provide an innovative electrical connector improving a high-frequency signal transmission.

SUMMARY OF THE INVENTION

An object of the present invention is to provide an electrical connector. The electrical connector includes an insulating housing, an upper terminal assembly, a center grounding plate and an outer shell. A rear end of the insulating housing has two first penetrating grooves vertically penetrating through the insulating housing. The upper terminal assembly is fastened in the insulating housing. The upper terminal assembly includes a plurality of upper terminals and an upper base portion. The plurality of the upper terminals are fastened in the upper base portion. The plurality of the upper terminals include a plurality of upper grounding terminals and a plurality of upper signal terminals. Two adjacent upper signal terminals of each side of the upper terminal assembly are disposed between two upper grounding terminals. Each upper terminal has an upper fastening portion. A front end of the upper fastening portion extends frontward to form an upper contacting portion. A rear end of the upper fastening portion is bent upward to form a first upper bending portion. An upper end of the first upper bending portion extends rearward to form an upper extending portion. A rear end of the upper extending portion is bent downward to form a second upper bending portion. A lower end of the second upper bending portion extends rearward to form an upper soldering portion. A rear end of the upper base portion defines two second penetrating grooves vertically penetrating through the upper base portion. The two second penetrating grooves are aligned with the two first penetrating grooves along a vertical direction. The upper extending portions of two outermost upper grounding terminals of the plurality of the upper terminals are exposed outside to a top surface of the upper base portion through the two second penetrating grooves. The upper extending portions of the two outermost upper grounding terminals of the plurality of the upper terminals are exposed outside of the insulating housing through the two second penetrating grooves and the two first penetrating grooves. The center grounding plate is fastened in the insulating housing. The center grounding plate has a front plate. The front plate is corresponding to the upper fastening portions and the upper contacting portions of the plurality of the upper terminals. A rear end of the front plate is bent upward to form a bending plate. The bending plate is corresponding to the first upper bending portions of the plurality of the upper terminals. A rear end of the bending plate extends rearward to form a rear plate. The rear plate is corresponding to the upper extending portions of the plurality of the upper terminals of the upper terminal assembly. Two opposite sides of a top surface of the rear plate protrude towards the upper grounding terminal to form two protrusions, respectively. The upper extending portions of the two outermost upper grounding terminals of the upper terminal assembly contact with the two protrusions to define a lower grounding point. The outer shell is disposed to a top surface of the insulating housing. Two opposite sides of a rear end of a top surface of the outer shell extend towards the insulating housing to form two elastic arms, respectively. The two elastic arms pass through the two first penetrating grooves and the two second penetrating grooves, and then the two elastic arms contact with the upper extending portions of the two outermost upper grounding terminals of the upper terminal assembly to define an upper grounding point. The upper grounding point is aligned with the lower grounding point along the vertical direction.

Another object of the present invention is to provide an electrical connector. The electrical connector includes an insulating housing, an upper terminal assembly, a center grounding plate, a lower terminal assembly and an outer shell. A rear end of the insulating housing has two first penetrating grooves vertically penetrating through the insulating housing. The upper terminal assembly is fastened in the insulating housing. The upper terminal assembly includes a plurality of upper terminals and an upper base portion. The plurality of the upper terminals are fastened in the upper base portion. The plurality of the upper terminals include a plurality of upper grounding terminals and a plurality of upper signal terminals. Two adjacent upper signal terminals of each side of the upper terminal assembly are disposed between two upper grounding terminals. Each upper terminal has an upper fastening portion. A front end of the upper fastening portion extends frontward to form an upper contacting portion. A rear end of the upper fastening portion is bent upward to form a first upper bending portion. An upper end of the first upper bending portion extends rearward to form an upper extending portion. A rear end of the upper extending portion is bent downward to form a second upper bending portion. A lower end of the second upper bending portion extends rearward to form an upper soldering portion. A rear end of the upper base portion defines two second penetrating grooves vertically penetrating through the upper base portion. The two second penetrating grooves are aligned with the two first penetrating grooves along a vertical direction. The upper extending portions of two outermost upper grounding terminals of the plurality of the upper terminals are exposed outside to a top surface of the upper base portion through the two second penetrating grooves. The upper extending portions of the two outermost upper grounding terminals of the plurality of the upper terminals are exposed outside of the insulating housing through the two second penetrating grooves and the two first penetrating grooves. One side of the upper fastening portion of each upper signal terminal of two sides of the upper terminal assembly is recessed inward to form a first lacking groove. A junction between one side of the first upper bending portion and one side of the upper extending portion of each upper signal terminal of the two sides of the upper terminal assembly is recessed inward to form a second lacking groove. A junction between one side of the upper fastening portion and one side of the upper contacting portion of each upper grounding terminal is recessed inward to form a third lacking groove. One side of the second upper bending portion of each upper grounding terminal is recessed inward to form a fourth lacking groove extending to the rear end of the upper extending portion. The center grounding plate is fastened in the insulating housing. The center grounding plate has a front plate. The front plate is corresponding to the upper fastening portions and the upper contacting portions of the plurality of the upper terminals. A rear end of the front plate is bent upward to form a bending plate. The bending plate is corresponding to the first upper bending portions of the plurality of the upper terminals. A rear end of the bending plate extends rearward to form a rear plate. The rear plate is corresponding to the upper extending portions of the plurality of the upper terminals of the upper terminal assembly. Two opposite sides of a top surface of the rear plate protrude towards the upper grounding terminal to form two protrusions, respectively. The upper extending portions of the two outermost upper grounding terminals of the upper terminal assembly contact with the two protrusions to define a lower grounding point. The lower terminal assembly is fastened in the insulating housing. The center grounding plate is disposed between the upper terminal assembly and the lower terminal assembly. The lower terminal assembly includes a plurality of lower terminals. The plurality of the lower terminals include a plurality of lower signal terminals. Each lower terminal has a lower fastening portion. One side of the lower fastening portion of each lower signal terminal of two sides of the lower terminal assembly is recessed inward to form a fifth lacking groove. The outer shell is disposed to a top surface of the insulating housing. Two opposite sides of a rear end of a top surface of the outer shell extend towards the insulating housing to form two elastic arms, respectively. The two elastic arms pass through the two first penetrating grooves and the two second penetrating grooves, and then the two elastic arms contact with the upper extending portions of the two outermost upper grounding terminals of the upper terminal assembly to define an upper grounding point. The upper grounding point is aligned with the lower grounding point along the vertical direction.

Another object of the present invention is to provide an electrical connector. The electrical connector includes an insulating housing, an upper terminal assembly, a center grounding plate, a lower terminal assembly and an outer shell. A rear end of the insulating housing has two first penetrating grooves vertically penetrating through the insulating housing. The upper terminal assembly is fastened in the insulating housing. The upper terminal assembly includes a plurality of upper terminals and an upper base portion. The plurality of the upper terminals are fastened in the upper base portion. The plurality of the upper terminals include a plurality of upper grounding terminals and a plurality of upper signal terminals. Two adjacent upper signal terminals of each side of the upper terminal assembly are disposed between two upper grounding terminals. Each upper terminal has an upper fastening portion. A front end of the upper fastening portion extends frontward to form an upper contacting portion. A rear end of the upper fastening portion is bent upward to form a first upper bending portion. An upper end of the first upper bending portion extends rearward to form an upper extending portion. A rear end of the upper extending portion is bent downward to form a second upper bending portion. A lower end of the second upper bending portion extends rearward to form an upper soldering portion. A rear end of the upper base portion defines two second penetrating grooves vertically penetrating through the upper base portion. The two second penetrating grooves are aligned with the two first penetrating grooves along a vertical direction. The upper extending portions of two outermost upper grounding terminals of the plurality of the upper terminals are exposed outside to a top surface of the upper base portion through the two second penetrating grooves. The upper extending portions of the two outermost upper grounding terminals of the plurality of the upper terminals are exposed outside of the insulating housing through the two second penetrating grooves and the two first penetrating grooves. One side of the upper fastening portion of each upper signal terminal of two sides of the upper terminal assembly is recessed inward to form a first lacking groove. A junction between one side of the first upper bending portion and one side of the upper extending portion of each upper signal terminal of the two sides of the upper terminal assembly is recessed inward to form a second lacking groove. A junction between one side of the upper fastening portion and one side of the upper contacting portion of each upper grounding terminal is recessed inward to form a third lacking groove. One side of the second upper bending portion of each upper grounding terminal is recessed inward to form a fourth lacking groove extending to the rear end of the upper extending portion. The center grounding plate is fastened in the insulating housing. The center grounding plate has a front plate. The front plate is corresponding to the upper fastening portion and the upper contacting portion of each upper terminal. A rear end of the front plate is bent upward to form a bending plate. The bending plate is corresponding to the first upper bending portions of the plurality of the upper terminals. A rear end of the bending plate extends rearward to form a rear plate. The rear plate is corresponding to the upper extending portions of the upper terminal assembly. Two opposite sides of a top surface of the rear plate protrude towards the upper grounding terminal to form two protrusions, respectively. Bottom surfaces of the rear parts of the upper extending portions of the two outermost upper grounding terminals of the upper terminal assembly contact with the two protrusions to define a lower grounding point. The lower terminal assembly is fastened in the insulating housing. The center grounding plate is disposed between the upper terminal assembly and the lower terminal assembly. The lower terminal assembly includes a plurality of lower terminals. The plurality of the lower terminals include a plurality of lower signal terminals. Each lower terminal has a lower fastening portion. One side of the lower fastening portion of each lower signal terminal of two sides of the lower terminal assembly is recessed inward to form a fifth lacking groove. The outer shell is disposed to a top surface of the insulating housing. Two opposite sides of a rear end of a top surface of the outer shell extend towards the insulating housing to form two elastic arms, respectively. The two elastic arms pass through the two first penetrating grooves and the two second penetrating grooves, and top surfaces of the rear parts of the upper extending portions of the two outermost upper grounding terminals of the upper terminal assembly contact with the two elastic arms to define an upper grounding point. The upper grounding point is aligned with the lower grounding point along the vertical direction.

As described above, the electrical connector achieves a 40 Gbps specification by virtue of the first lacking groove, the second lacking groove, the third lacking groove, the fourth lacking groove and the fifth lacking groove. Furthermore, the bottom surfaces of the rear parts of the upper extending portions of the two outermost upper grounding terminals of the upper terminal assembly contact with the two protrusions of the center grounding plate, and the top surfaces of the rear parts of the upper extending portions of the two outermost upper grounding terminals of the upper terminal assembly contact with the two elastic arms of the outer shell for improving a resonance problem generated from a grounding loop to an adjacent radio frequency (RF) signal of a high frequency electromagnetic wave in a high-frequency characteristic of a transmission signal of the electrical connector. As a result, the electrical connector improves a high-frequency signal transmission.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
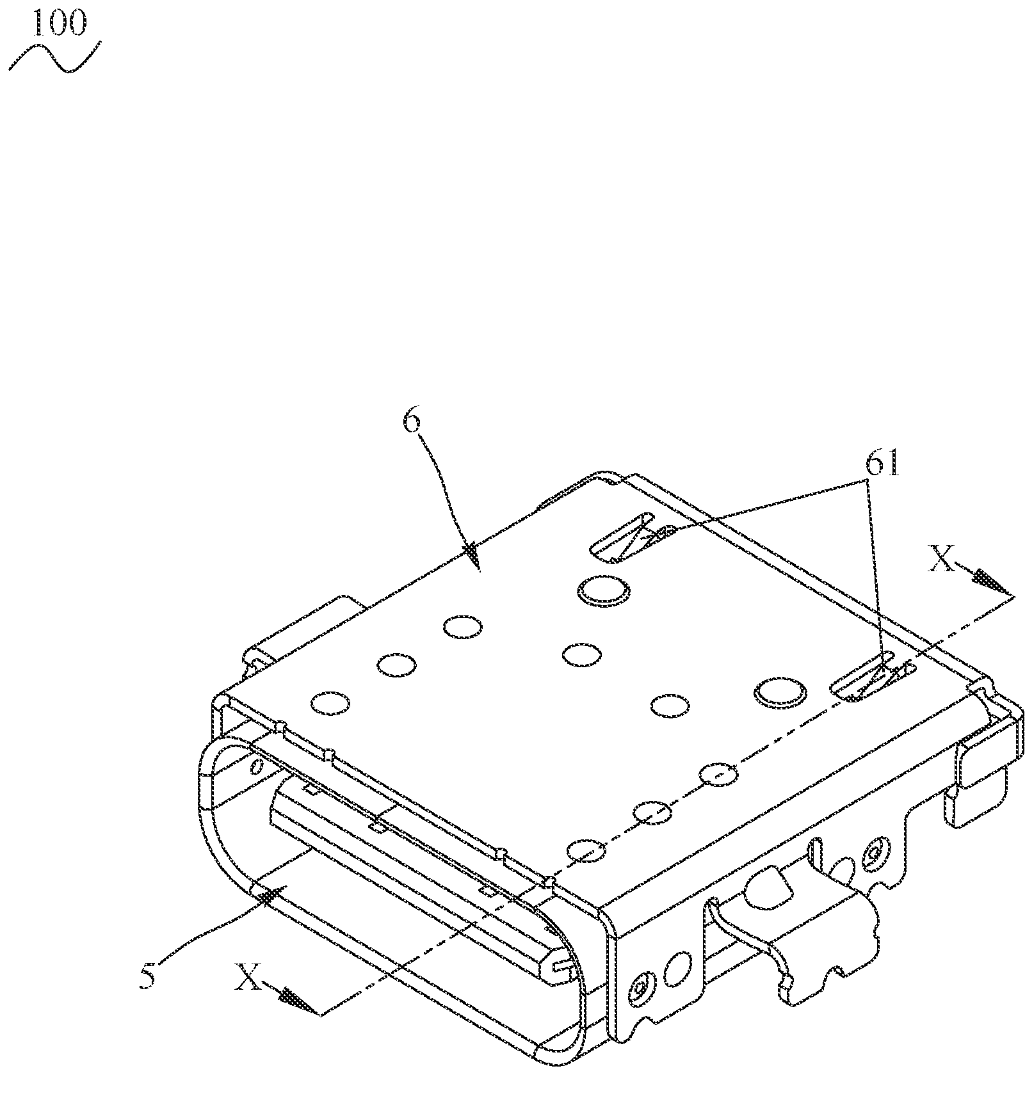
FIG. 1 is a perspective view of an electrical connector in accordance with a preferred embodiment of the present invention.

With reference to FIG. 1 to FIG. 4, an electrical connector 100 in accordance with a preferred embodiment of the present invention is shown. The electrical connector 100 includes an insulating housing 1, a terminal assembly 2, a center grounding plate 3, two shielding plates 4, an inner shell 5 with a guiding function, and an outer shell 6. In the preferred embodiment, the electrical connector 100 is a USB (Universal Serial Bus) TYPE-C connector. In a concrete implementation, the electrical connector 100 is able to be another type connector which is different from the USB TYPE-C connector.

The terminal assembly 2 is fastened in the insulating housing 1. The center grounding plate 3 is mounted in a middle of the terminal assembly 2, and the terminal assembly 2 and the center grounding plate 3 are fastened in the insulating housing 1. The insulating housing 1 surrounds the center grounding plate 3 and the terminal assembly 2. The two shielding plates 4 are disposed to an upper surface and a lower surface of the insulating housing 1. The inner shell 5 is disposed to a front end of the insulating housing 1, and the insulating housing 1 is partially surrounded by the inner shell 5. The outer shell 6 is disposed to top surfaces of the insulating housing 1 and the inner shell 5.

Referring to FIG. 1 to FIG. 4, the insulating housing 1 has a base body 11, a stepping portion 12, a tongue portion 13, a rear portion 14 and two first penetrating grooves 15. A middle of a front surface of the base body 11 extends frontward to form the stepping portion 12. A middle of a front surface of the stepping portion 12 extends frontward to form the tongue portion 13. An upper portion of a rear surface of the base body 11 extends rearward to form the rear portion 14. One shielding plate 4 is disposed to a junction between an upper portion of the base body 11 and an upper portion of the stepping portion 12. The other shielding plate 4 is disposed to a junction between a lower portion of the base body 11 and a lower portion of the stepping portion 12. The terminal assembly 2 is exposed to a top surface and a bottom surface of the tongue portion 13. A rear end of the insulating housing 1 has the two first penetrating grooves 15 vertically penetrating through the insulating housing 1. The two first penetrating grooves 15 penetrate through a top surface and a bottom surface of the two opposite sides of a middle of the rear portion 14 of the insulating housing 1.

Middles of a top surface and a bottom surface of the base body 11 are recessed inward to form two first concave surfaces 111, respectively. The two first concave surfaces 111 extend to the front surface of the base body 11. The two first concave surfaces 111 are corresponding to corresponding mechanisms of the two shielding plates 4. Two opposite sides of each first concave surface 111 are recessed inward to form two first location holes 112, respectively. The corresponding mechanisms of the two shielding plates 4 are fastened in the first location holes 112 of the base body 11, so that the two shielding plates 4 are located to the insulating housing 1, and the two shielding plates 4 are fastened to the insulating housing 1. Front ends of the top surface and the bottom surface of the base body 11 are recessed inward to form a positioning hole 113. Two sides of the front end of the top surface of the base body 11 are recessed inward to form two positioning holes 113, respectively. Two sides of the front end of the bottom surface of the base body 11 are recessed inward to form another two positioning holes 113, respectively. A corresponding mechanism of the inner shell 5 is fastened in the positioning hole 113, so that the inner shell 5 is located to the insulating housing 1, and the inner shell 5 is fastened to the insulating housing 1.

Two middles of a top surface and a bottom surface of the stepping portion 12 are recessed inward to form two second concave surfaces 121, respectively. The two second concave surfaces 121 are corresponding to two corresponding positions of the two shielding plates 4. Two opposite sides of each second concave surface 121 are recessed inward to form two second location holes 122, respectively. The corresponding positions of the two shielding plates 4 are fastened in the second location holes 122 of the stepping portion 12, so that the two shielding plates 4 are located to the insulating housing 1, and the two shielding plates 4 are fastened to the insulating housing 1.

Referring to FIG. 5 to FIG. 8, the terminal assembly 2 is disposed in the insulating housing 1. The terminal assembly 2 includes an upper terminal assembly 21 fastened in the insulating housing 1, and a lower terminal assembly 22 fastened in the insulating housing 1. The upper terminal assembly 21 and the lower terminal assembly 22 are exposed to the top surface and the bottom surface of the tongue portion 13. The upper terminal assembly 21 is disposed on a top surface of the center grounding plate 3. The lower terminal assembly 22 is disposed under a bottom surface of the center grounding plate 3. The center grounding plate 3 is disposed between the upper terminal assembly 21 and the lower terminal assembly 22. The upper terminal assembly 21 includes a plurality of upper terminals 211 and an upper base portion 212. The plurality of the upper terminals 211 are fastened in the upper base portion 212.

Each upper terminal 211 has an upper fastening portion 2111, an upper contacting portion 2112, a first upper bending portion 2113, an upper extending portion 2114, a second upper bending portion 2115 and an upper soldering portion 2116. A front end of the upper fastening portion 2111 extends frontward to form the upper contacting portion 2112. A rear end of the upper fastening portion 2111 is bent upward to form the first upper bending portion 2113. An upper end of the first upper bending portion 2113 extends rearward to form the upper extending portion 2114. A rear end of the upper extending portion 2114 is bent downward to form the second upper bending portion 2115. A lower end of the second upper bending portion 2115 extends rearward to form the upper soldering portion 2116.

The upper terminal assembly 21 has a plurality of upper grounding terminals 213 and a plurality of upper signal terminals 214. The plurality of the upper terminals 211 include the plurality of the upper grounding terminals 213 and the plurality of the upper signal terminals 214. In the preferred embodiment, two adjacent upper signal terminals 214 of each side of the upper terminal assembly 21 are disposed between two upper grounding terminals 213. One side of the upper fastening portion 2111 of each upper signal terminal 214 of two sides of the upper terminal assembly 21 is recessed inward to form a first lacking groove 215. A junction between one side of the first upper bending portion 2113 and one side of the upper extending portion 2114 of each upper signal terminal 214 of the two sides of the upper terminal assembly 21 is recessed inward to form a second lacking groove 216. Two opposite sides of a front of a bottom surface of the upper contacting portion 2112 of each upper signal terminal 214 of the two sides of the upper terminal assembly 21 slantwise extend inward and downward to form two upper chamfers 217. The first lacking groove 215, the second lacking groove 216 and each upper chamfer 217 are used for improving an impedance of the electrical connector 100. The first lacking grooves 215 of each two adjacent upper signal terminals 214 of the two sides of the upper terminal assembly 21 face each other. The second lacking grooves 216 of each two adjacent upper signal terminals 214 of the two sides of the upper terminal assembly 21 face each other. In the preferred embodiment, a width of each upper grounding terminal 213 is wider than a width of each upper signal terminal 214.

A junction between one side of the upper fastening portion 2111 and one side of the upper contacting portion 2112 of each upper grounding terminal 213 is recessed inward to form a third lacking groove 218. The third lacking groove 218 is used for improving the impedance of the electrical connector 100. One side of the second upper bending portion 2115 of each upper grounding terminal 213 is recessed inward to form a fourth lacking groove 219 extending to the rear end of the upper extending portion 2114.

A first gap 101 is formed between the upper extending portion 2114 of the upper grounding terminal 213 and the upper extending portion 2114 of the upper signal terminal 214 which are adjacent to each other. A second gap 102 is formed between an inner wall of the fourth lacking groove 219 of the upper grounding terminal 213 and the second upper bending portion 2115 of the upper signal terminal 214 which are adjacent to each other. A third gap 103 is formed between an inner wall of the third lacking groove 218 of the upper grounding terminal 213 and the upper contacting portion 2112 of the upper signal terminal 214 which are adjacent to each other. A fourth gap 104 is formed between the upper contacting portions 2112 of the two adjacent upper signal terminals 214 of each side of the upper terminal assembly 21. A fifth gap 105 is formed between two inner walls of the two first lacking grooves 215 of the two adjacent upper signal terminals 214 of each side of the upper terminal assembly 21. A sixth gap 106 is formed between two inner walls of the two second lacking grooves 216 of the two adjacent upper signal terminals 214 of each side of the upper terminal assembly 21. Therefore, the first gap 101 is smaller than the second gap 102. The second gap 102 is equal to the third gap 103. The third gap 103 is equal to the fourth gap 104. The fourth gap 104 is smaller than the fifth gap 105. The fifth gap 105 is equal to the sixth gap 106. The first gap 101, the second gap 102, the third gap 103, the fourth gap 104, the fifth gap 105 and the sixth gap 106 are used for improving the impedance of the electrical connector 100.

The upper base portion 212 has an upper base body 2121, an upper tongue portion 2122, an upper stepping portion 2123 and an upper rear portion 2124. A lower portion of a front surface of the upper base body 2121 extends frontward to form the upper tongue portion 2122. A rear end of the upper base body 2121 is bent upward to form the upper stepping portion 2123. A top end of the upper stepping portion 2123 extends rearward to form the upper rear portion 2124. The upper fastening portions 2111 of the plurality of the upper terminals 211 are fastened in the upper base body 2121. The upper fastening portions 2111 of the plurality of the upper terminals 211 are surrounded by the upper base body 2121. The upper contacting portions 2112 of the plurality of the upper terminals 211 are fastened to the upper tongue portion 2122 of the upper base portion 212. The upper contacting portions 2112 of the plurality of the upper terminals 211 are partially surrounded by the upper tongue portion 2122 of the upper base portion 212. The first upper bending portions 2113 of the plurality of the upper terminals 211 are fastened in the upper stepping portion 2123 of the upper base portion 212. The first upper bending portions 2113 of the plurality of the upper terminals 211 are surrounded by the upper stepping portion 2123 of the upper base portion 212. The upper extending portions 2114 and the second upper bending portions 2115 of the plurality of the upper terminals 211 are fastened in the upper rear portion 2124 of the upper base portion 212. The upper extending portions 2114 and the second upper bending portions 2115 of the plurality of the upper terminals 211 are surrounded by the upper rear portion 2124 of the upper base portion 212. The upper soldering portions 2116 of the plurality of the upper terminals 211 are exposed out of a rear end of the upper rear portion 2124.

The upper base portion 212 has a plurality of upper fastening grooves 2125, an upper receiving groove 2126, two upper protruding blocks 2127 and two second penetrating grooves 2128. The plurality of the upper fastening grooves 2125 are formed to the upper tongue portion 2122 and the upper rear portion 2124 of the upper base portion 212. When the plurality of the upper terminals 211 and the upper base portion 212 are in a molding process, the plurality of the upper fastening grooves 2125 are cooperated with a jig (not shown) to be used for stabilizing positions of the plurality of the upper terminals 211. The plurality of the upper fastening grooves 2125 improve an insertion loss, a return loss and the impedance of the electrical connector 100. A bottom surface of the upper base portion 212 is recessed inward to form the upper receiving groove 2126. The upper receiving groove 2126 is used for receiving a corresponding structure of the lower terminal assembly 22, so that the upper terminal assembly 21 is located to the lower terminal assembly 22, and the upper terminal assembly 21 is fastened to the lower terminal assembly 22.

Two portions of the bottom surface of the upper base portion 212 extend downward to form the two upper protruding blocks 2127. The upper receiving groove 2126 is located between the two upper protruding blocks 2127. The two upper protruding blocks 2127 are used for buckling with the corresponding structure of the lower terminal assembly 22, so that the upper terminal assembly 21 is located to the lower terminal assembly 22, and the upper terminal assembly 21 is fastened to the lower terminal assembly 22. A rear end of the upper base portion 212 defines the two second penetrating grooves 2128 vertically penetrating through the upper base portion 212. Two sides of a rear of the upper rear portion 2124 of the upper base portion 212 define the two second penetrating grooves 2128 penetrating through a top surface and a bottom surface of the upper rear portion 2124 of the upper base portion 212. The two second penetrating grooves 2128 are corresponding to the two first penetrating grooves 15 of the insulating housing 1. The two second penetrating grooves 2128 are aligned with the two first penetrating grooves 15 of the insulating housing 1 along a vertical direction. Rear parts of the upper extending portions 2114 of two outermost upper grounding terminals 213 of the plurality of the upper terminals 211 are exposed outside to a top surface of the upper base portion 212 through the two second penetrating grooves 2128. The rear parts of the upper extending portions 2114 of the two outermost upper grounding terminals 213 of the plurality of the upper terminals 211 are exposed outside of the insulating housing 1 through the two second penetrating grooves 2128 and the two first penetrating grooves 15. The rear parts of the upper extending portions 2114 of the plurality of the upper terminals 211 are exposed outside of the insulating housing 1 through the two second penetrating grooves 2128 and the two first penetrating grooves 15.

The lower terminal assembly 22 includes a plurality of lower terminals 221 and a lower base portion 222. The plurality of the lower terminals 221 are fastened to the lower base portion 222. Each lower terminal 221 has a lower fastening portion 2211, a lower contacting portion 2212, a lower bending portion 2213 and a lower soldering portion 2214. A front end of the lower fastening portion 2211 extends frontward to form the lower contacting portion 2212. A rear end of the lower fastening portion 2211 is bent upward to form the lower bending portion 2213. A top end of the lower bending portion 2213 extends rearward to form the lower soldering portion 2214.

The lower terminal assembly 22 has a plurality of lower grounding terminals 223 and a plurality of lower signal terminals 224. The plurality of the lower terminals 221 include the plurality of the lower grounding terminals 223 and the plurality of the lower signal terminals 224. In the preferred embodiment, two adjacent lower signal terminals 224 of each side of the lower terminal assembly 22 are disposed between two lower grounding terminals 223. One side of the lower fastening portion 2211 of each lower signal terminal 224 of two sides of the lower terminal assembly 22 is recessed inward to form a fifth lacking groove 225. Two opposite sides of a front of a top surface of the lower contacting portion 2212 of each lower signal terminal 224 of the two sides of the lower terminal assembly 22 slantwise extend inward and upward to form two lower chamfers 226. The fifth lacking groove 225 and the two lower chamfers 226 of each lower signal terminal 224 of the two sides of the lower terminal assembly 22 are used for improving the impedance of the electrical connector 100. In the preferred embodiment, a clearance 107 is formed between two facing inner walls of the two fifth lacking grooves 225 of the two adjacent lower signal terminals 224 of each side of the lower terminal assembly 22. A function of the clearance 107 is the same as a function of the fifth gap 105. A structure of the clearance 107 is the same as a structure of the fifth gap 105. The clearance 107 is equal to the fifth gap 105.

The lower base portion 222 has a lower base body 2221, a lower tongue portion 2222, a lower stepping portion 2223 and a lower rear portion 2224. A front end of the lower base body 2221 extends frontward to form the lower tongue portion 2222. A rear end of the lower base body 2221 is bent upward to form the lower stepping portion 2223. A top end of the lower stepping portion 2223 extends rearward to form the lower rear portion 2224. The lower fastening portions 2211 of the plurality of the lower terminals 221 are fastened in the lower base body 2221 of the lower base portion 222. The lower fastening portions 2211 of the plurality of the lower terminals 221 are surrounded by the lower base body 2221 of the lower base portion 222. The lower contacting portions 2212 of the plurality of the lower terminals 221 are fastened to the lower tongue portion 2222 of the lower base portion 222. The lower contacting portions 2212 of the plurality of the lower terminals 221 are partially surrounded by the lower tongue portion 2222 of the lower base portion 222. The lower bending portions 2213 of the plurality of the lower terminals 221 are fastened in the lower stepping portion 2223 of the lower base portion 222. The lower bending portions 2213 of the plurality of the lower terminals 221 are surrounded by the lower stepping portion 2223 of the lower base portion 222. The lower soldering portions 2214 of the plurality of the lower terminals 221 are fastened to the lower rear portion 2224. Front ends of the lower soldering portions 2214 of the plurality of the lower terminals 221 are surrounded by the lower rear portion 2224. Rear ends of the lower soldering portions 2214 of the plurality of the lower terminals 221 are exposed out of a rear end of the lower rear portion 2224 of the lower base portion 222.

The lower base portion 222 has a plurality of lower fastening grooves 2225, two lower receiving grooves 2226 and a lower protruding block 2227. The plurality of the lower fastening grooves 2225 are formed to the lower base body 2221, the lower tongue portion 2222 and the lower rear portion 2224. When the plurality of the lower terminals 221 and the lower base portion 222 are in a molding process, the plurality of the lower fastening grooves 2225 are cooperated with the jig (not shown) to be used for stabilizing positions of the plurality of the lower terminals 221. The plurality of the lower fastening grooves 2225 improve the insertion loss, the return loss and the impedance of the electrical connector 100. Two portions of a top surface of the lower base portion 222 are recessed inward to form the two lower receiving grooves 2226. The two upper protruding blocks 2127 of the upper terminal assembly 21 are received in the two lower receiving grooves 2226, so that the upper terminal assembly 21 is located to the lower terminal assembly 22, and the upper terminal assembly 21 is fastened to the lower terminal assembly 22. The top surface of the lower base portion 222 extends upward to form the lower protruding block 2227. In the preferred embodiment, the lower protruding block 2227 is disposed between the two lower receiving grooves 2226. The lower protruding block 2227 is buckled in the upper receiving groove 2126 of the upper terminal assembly 21, so that the upper terminal assembly 21 is located to the lower terminal assembly 22, and the upper terminal assembly 21 is fixed to the lower terminal assembly 22. The lower protruding block 2227 is disposed between the two upper protruding blocks 2127 of the upper base portion 212.

Referring to FIG. 1 to FIG. 9, the center grounding plate 3 has a front plate 31, a bending plate 32, a rear plate 33 and two soldering feet 34. The front plate 31 is disposed horizontally. The front plate 31 is corresponding to the upper fastening portions 2111 and the upper contacting portions 2112 of the plurality of the upper terminals 211. A rear end of the front plate 31 is bent upward to form the bending plate 32. The bending plate 32 is corresponding to the first upper bending portions 2113 of the plurality of the upper terminals 211. The bending plate 32 is disposed between the first upper bending portions 2113 of the plurality of the upper terminals 211 and the lower bending portions 2213 of the plurality of the lower terminals 221. A rear end of the bending plate 32 extends rearward to form the rear plate 33. In the preferred embodiment, two opposite sides of a front end of the front plate 31 are exposed out of the tongue portion 13 of the insulating housing 1, and the two opposite sides of the front end of the front plate 31 contact with another electrical connector (not shown) to achieve a grounding effect and reduce a resonance.

The front plate 31 has a third location hole 311 penetrating through a top surface and a bottom surface of the front plate 31. The two upper protruding blocks 2127 of the upper terminal assembly 21 are fastened in the third location hole 311 of the front plate 31, so that the center grounding plate 3 is located to the upper terminal assembly 21, and the center grounding plate 3 is fastened to the upper terminal assembly 21. The lower protruding block 2227 of the lower terminal assembly 22 is fastened in the third location hole 311 of the front plate 31, so that the center grounding plate 3 is located to the lower terminal assembly 22, and the center grounding plate 3 is fastened to the lower terminal assembly 22. Two opposite sides of the rear end of the front plate 31 extend outward to form two wings 312. The two wings 312 are exposed outside of two opposite sides of the base body 11 of the insulating housing 1. The two wings 312 contact with two opposite sides of an inner surface of the inner shell 5.

Figure 3:
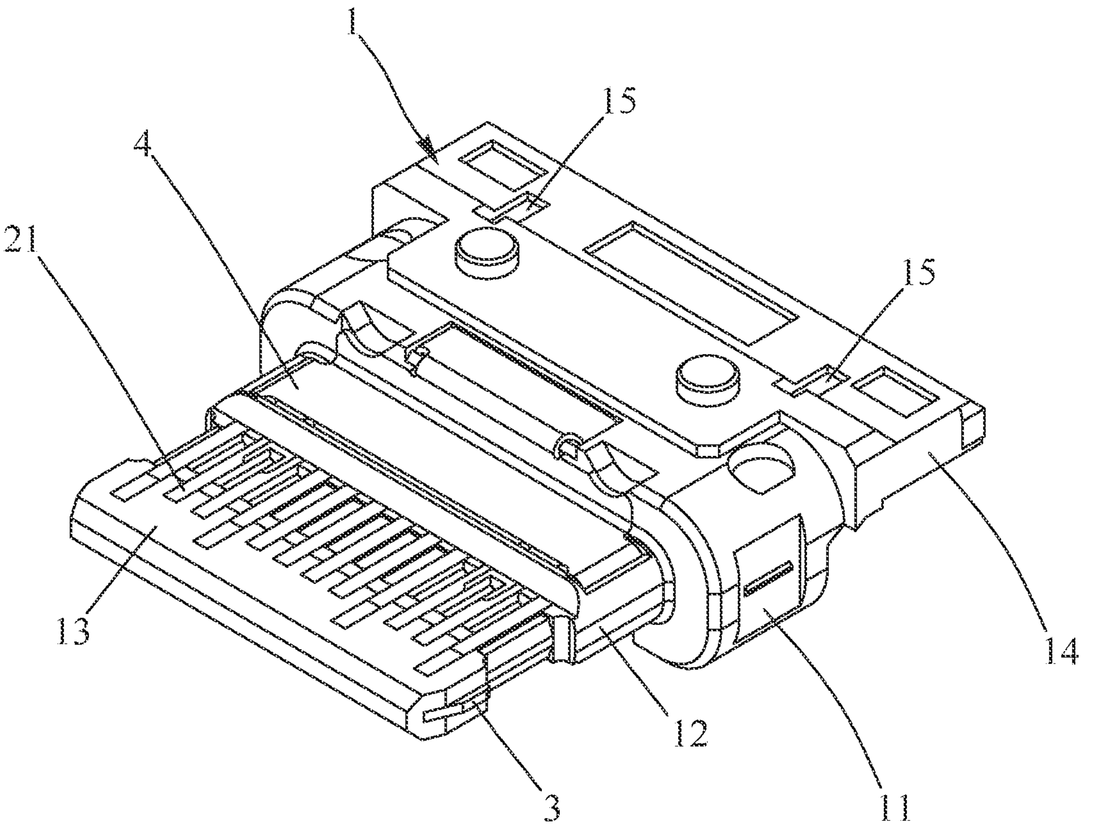
FIG. 3 is a partially perspective view of the electrical connector of FIG. 1.
Figure 9:
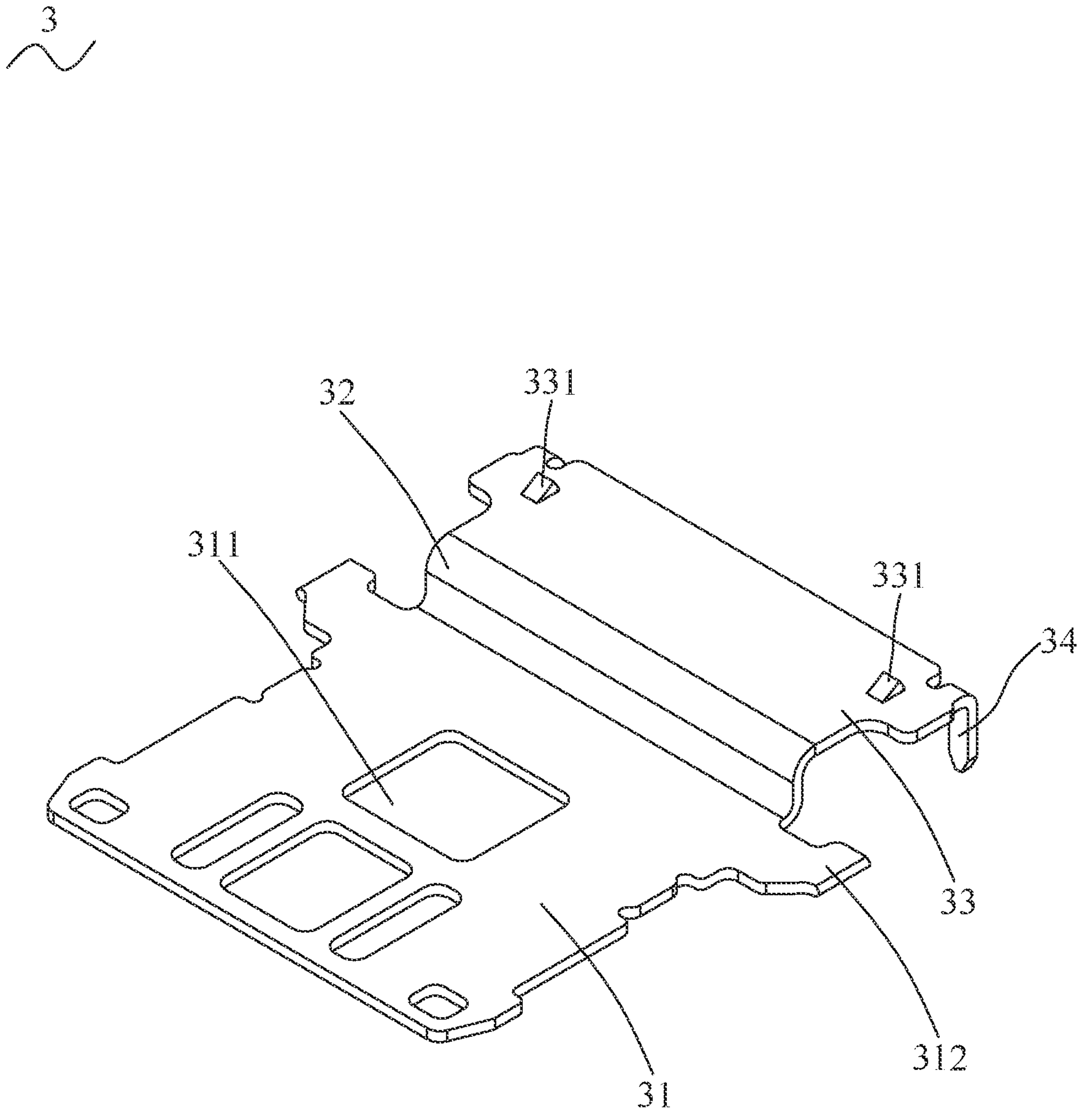
FIG. 9 is a perspective view of a center grounding plate of the electrical connector of FIG. 1.
Figure 10:
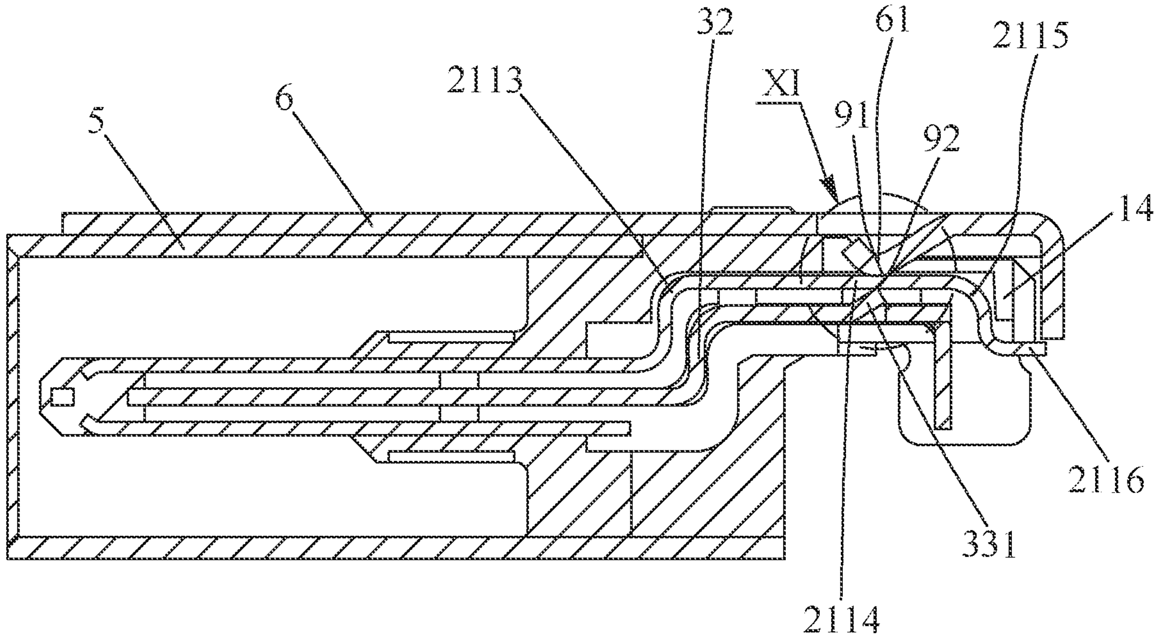
FIG. 10 is a sectional view of the electrical connector along a line X-X of FIG. 1.
Figure 11:
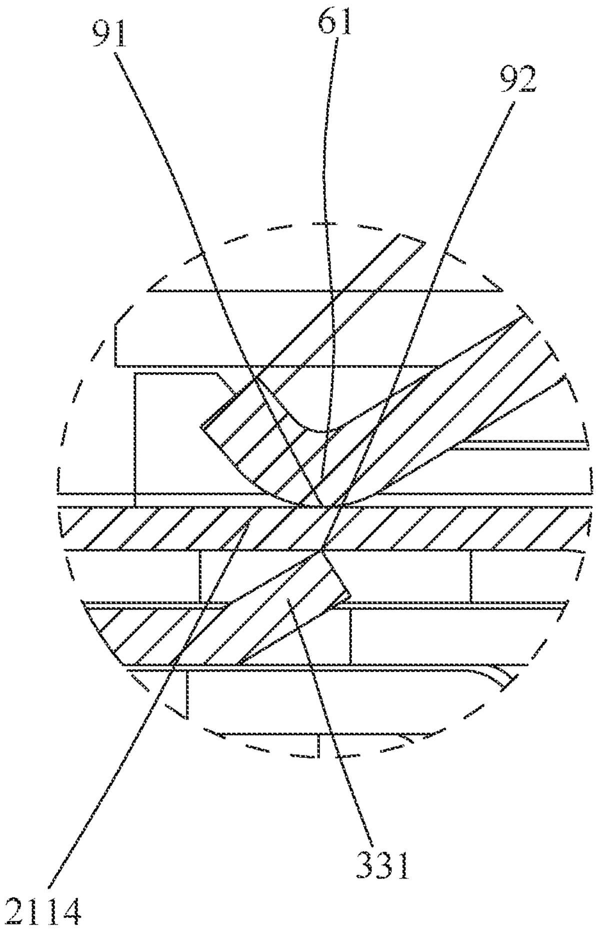
FIG. 11 is an enlarged view of an encircled portion XI of FIG. 10.

Referring to FIG. 3, FIG. 9 and FIG. 10, two opposite sides of a top surface of the rear plate 33 protrude towards the upper terminal assembly 21 to form two protrusions 331, respectively. In the preferred embodiment, bottom surfaces of the rear parts of the upper extending portions 2114 of the upper grounding terminals 213 of the upper terminal assembly 21 contact with the two protrusions 331 for improving a resonance problem generated from a grounding loop to an adjacent radio frequency (RF) signal of a high frequency electromagnetic wave in a high-frequency characteristic of a transmission signal of the electrical connector 100. In addition, the rear parts of the upper extending portions 2114 of the two outermost upper grounding terminals 213 of the upper terminal assembly 21 contact with the two protrusions 331 for improving the insertion loss of the electrical connector 100 which is above 14 GHz. In another preferred embodiment, the two protrusions 331 contact with the lower grounding terminals 223 of the lower terminal assembly 22.

In the preferred embodiment, the rear plate 33 is corresponding to the upper extending portions 2114 of the plurality of the upper terminals 211 of the upper terminal assembly 21. A length of the rear plate 33 is longer than a length of the lower soldering portion 2214 of each lower terminal 221 of the lower terminal assembly 22. The rear plate 33 is corresponding to positions of the fourth lacking grooves 219 extending to the rear ends of the upper extending portions 2114 of the plurality of the upper grounding terminals 213.

Figure 4:
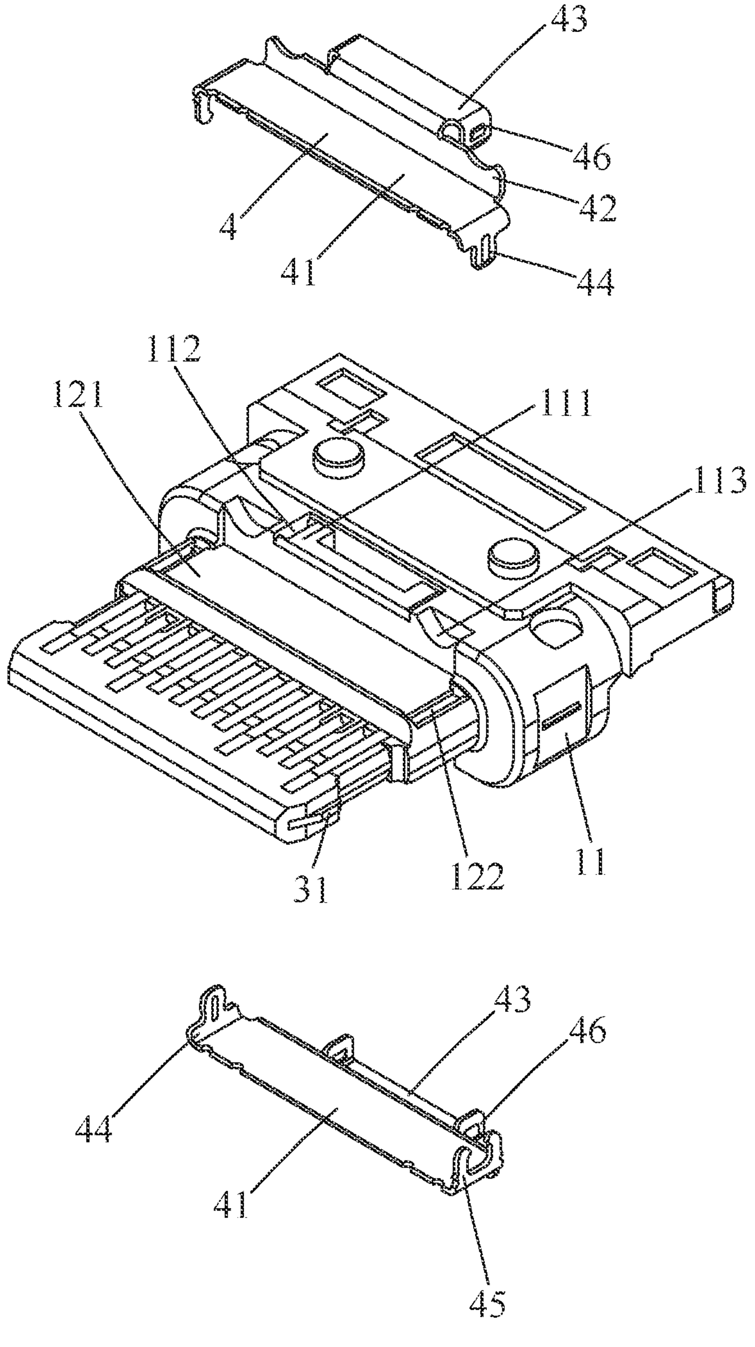
FIG. 4 is a partially exploded view of the electrical connector of FIG. 1.
Figure 5:
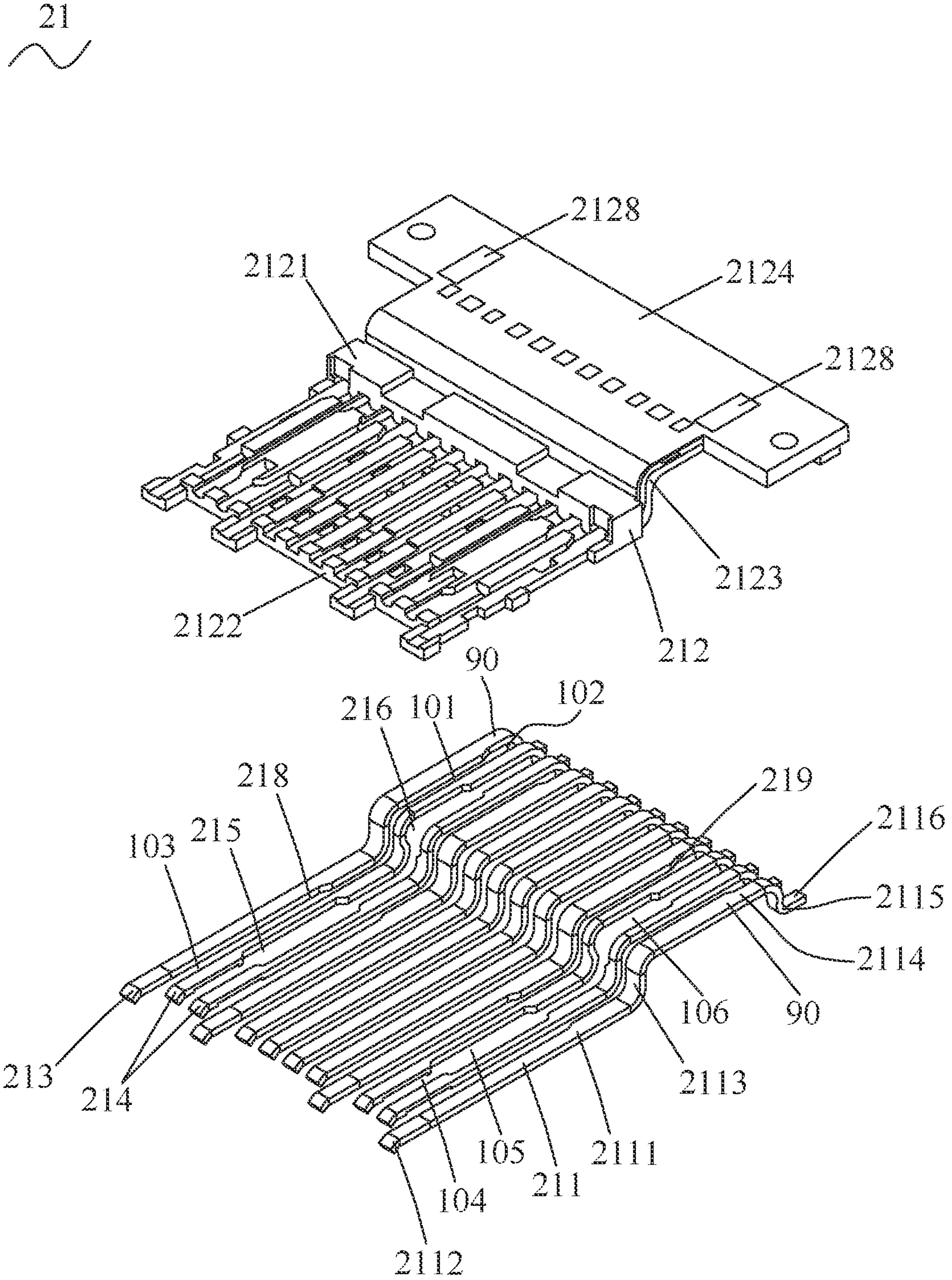
FIG. 5 is an exploded view of an upper terminal assembly of the electrical connector of FIG. 1.
Figure 6:
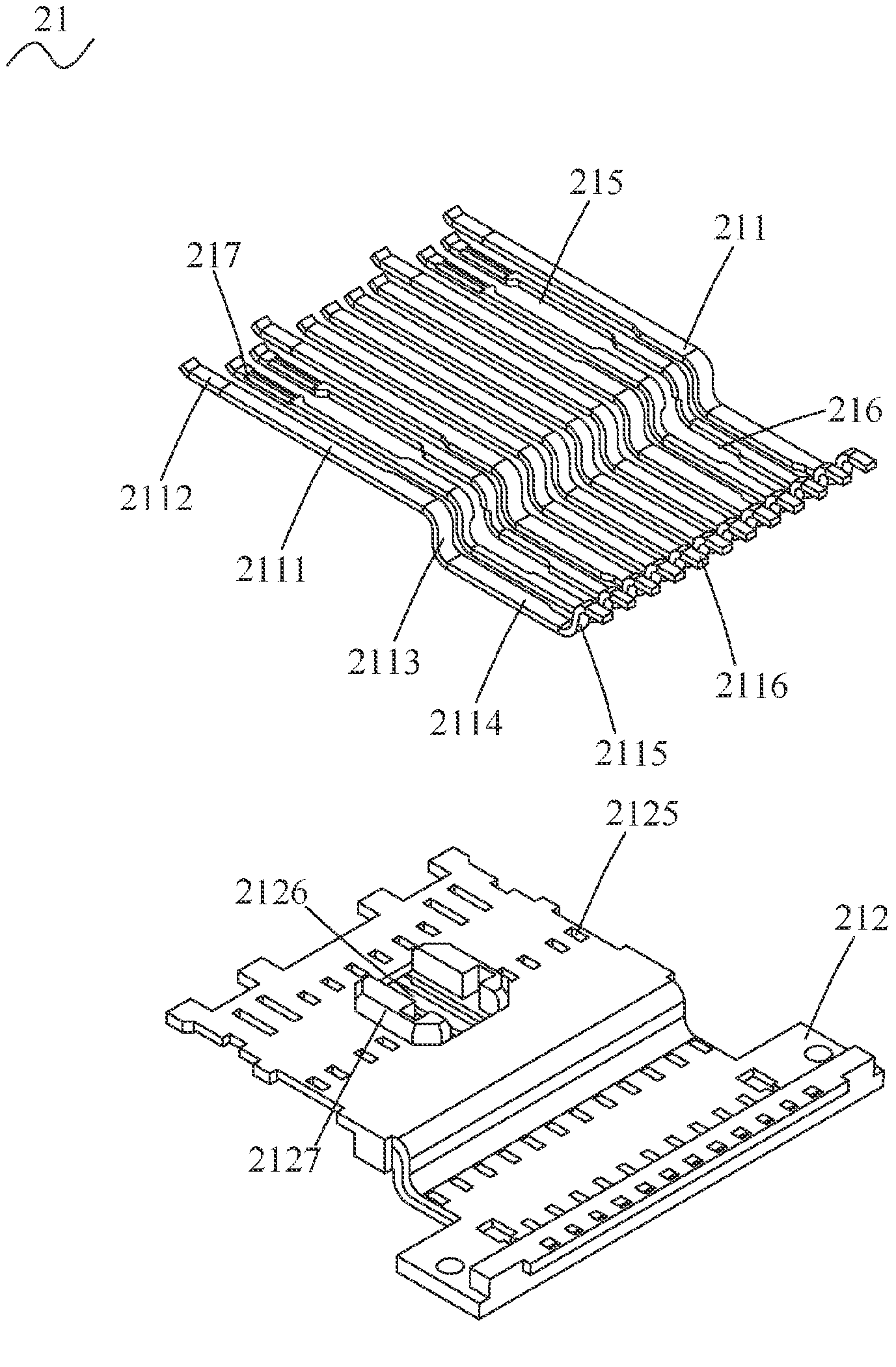
FIG. 6 is another exploded view of the upper terminal assembly of the electrical connector of FIG. 1.
Figure 7:
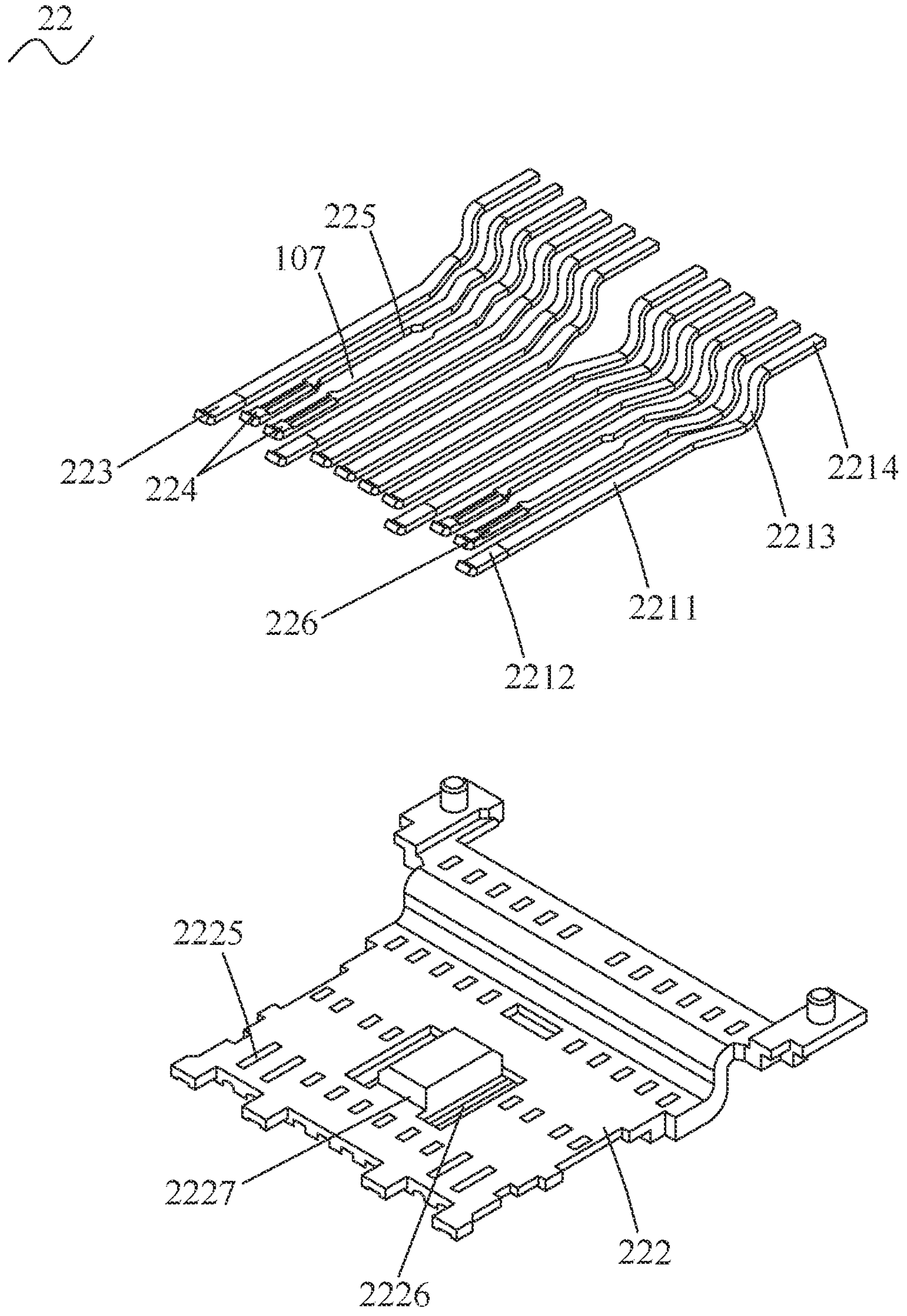
FIG. 7 is an exploded view of a lower terminal assembly of the electrical connector of FIG. 1.
Figure 8:
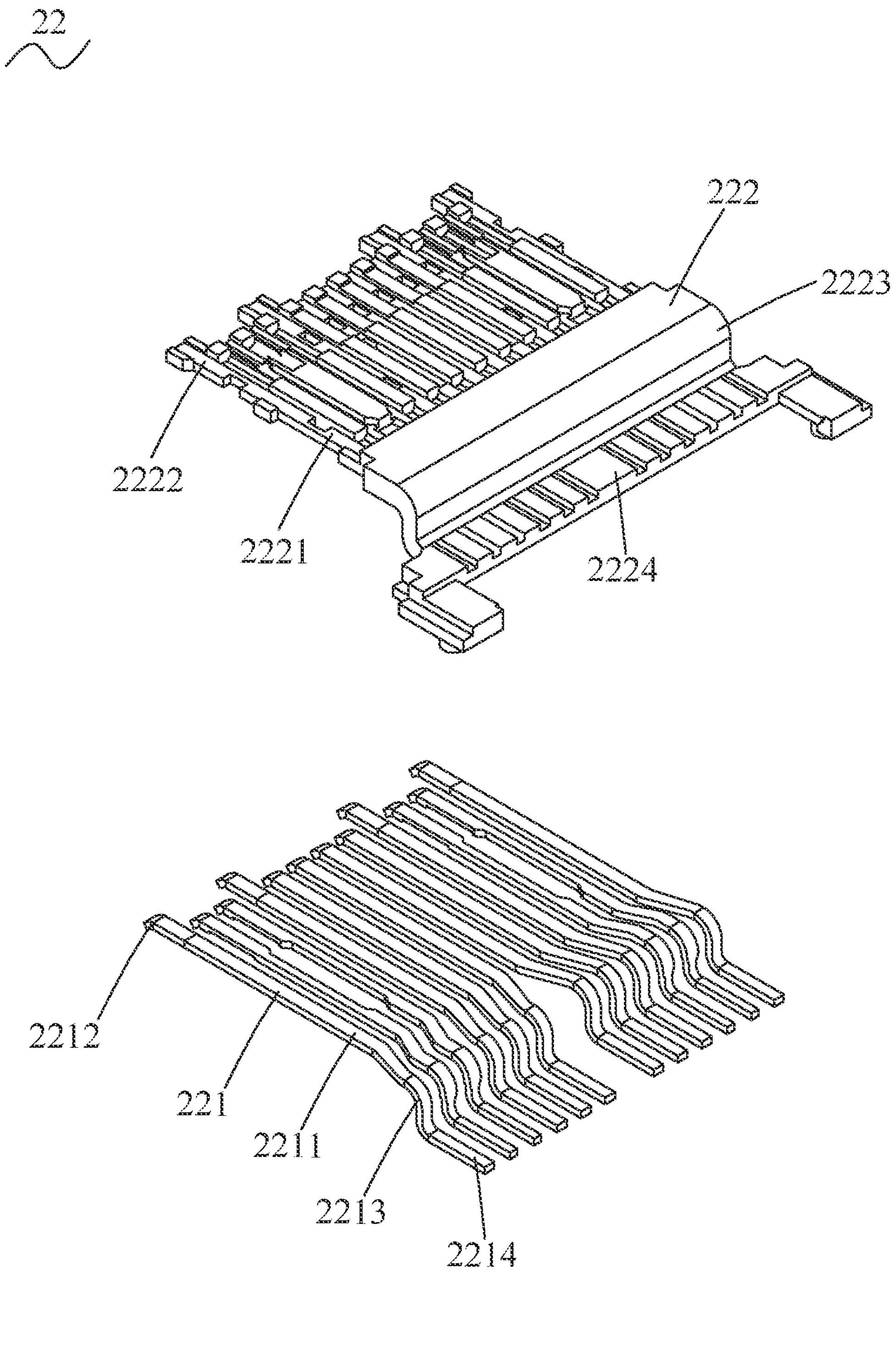
FIG. 8 is another exploded view of the lower terminal assembly of the electrical connector of FIG. 1.

Referring to FIG. 3 and FIG. 4, the two shielding plates 4 are disposed to the top surface and the bottom surface of the base body 11 and the top surface and the bottom surface of the stepping portion 12. Each shielding plate 4 has a front fastening plate 41, a connecting plate 42, a rear fastening plate 43, a first buckling portion 44, a U-shaped restricting portion 45 and two second buckling portions 46. The two front fastening plates 41 of the two shielding plates 4 are corresponding to the two second concave surfaces 121 of the stepping portion 12 of the insulating housing 1. A rear end of the front fastening plate 41 extends opposite to the insulating housing 1 to form the connecting plate 42. The connecting plate 42 is perpendicular to the front fastening plate 41. The connecting plate 42 is corresponding to the front surface of the base body 11 of the insulating housing 1. A rear end of the connecting plate 42 extends rearward to from the rear fastening plate 43. The two rear fastening plates 43 of the two shielding plates 4 are corresponding to the two first concave surfaces 111 of the base body 11 of the insulating housing 1.

Two opposite sides of the front fastening plate 41 extend towards the insulating housing 1 to form the first buckling portion 44 and the U-shaped restricting portion 45, respectively. In the preferred embodiment, the first buckling portion 44 is a T shape. The restricting portion 45 is the U shape. The first buckling portions 44 and the restricting portions 45 of the two shielding plates 4 are buckled with each other to fasten the two shielding plates 4. The first buckling portions 44 and the restricting portions 45 are disposed in the two second location holes 122 of the stepping portion 12 of the insulating housing 1, so that the two shielding plates 4 are located to the insulating housing 1, and the two shielding plates 4 are fastened to the insulating housing 1. Two opposite sides of the rear fastening plate 43 extend towards the insulating housing 1 to form two second buckling portions 46. The second buckling portions 46 of the two shielding plates 4 are disposed in the two first location holes 112 of the base body 11 of the insulating housing 1, so that the two shielding plates 4 are located to the insulating housing 1, and the two shielding plates 4 are fastened to the insulating housing 1. Two outer surfaces of the two rear fastening plates 43 of the two shielding plates 4 contact with the inner surface of the inner shell 5.

Figure 2:
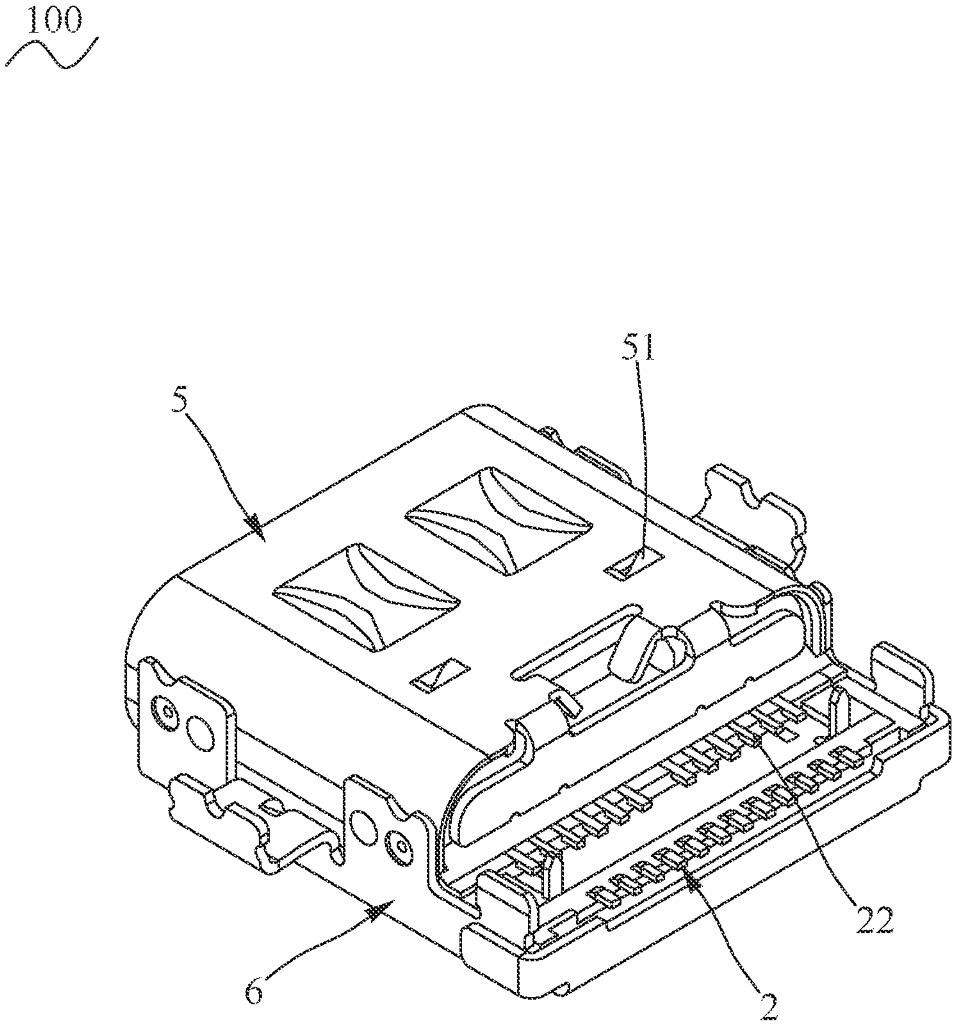
FIG. 2 is another perspective view of the electrical connector of FIG. 1.

Referring to FIG. 2, an upper portion and a lower portion of the inner shell 5 protrude towards the insulating housing 1 to form a convex block 51. The convex block 51 is buckled with the positioning hole 113 of the base body 11 of insulating housing 1, so that the inner shell 5 is located to the insulating housing 1, and the inner shell 5 is fastened to the insulating housing 1. In the preferred embodiment, a quantity of the convex block 51 of the inner shell 5 is the same as a quantity of the positioning hole 113 of the base body 11 of insulating housing 1. In the preferred embodiment, the upper portion of the inner shell 5 has two convex blocks 51, and the lower portion of the inner shell 5 has another two convex blocks 51.

Referring to FIG. 1 to FIG. 11, two opposite sides of a rear end of a top surface of the outer shell 6 extend towards the insulating housing 1 to form two elastic arms 61, respectively. The two elastic arms 61 are corresponding to the two first penetrating grooves 15 of the insulating housing 1 and the two second penetrating grooves 2128 of the upper terminal assembly 21. The two elastic arms 61 are aligned with the two first penetrating grooves 15 of the insulating housing 1 and the two second penetrating grooves 2128 of the upper terminal assembly 21 along the vertical direction. The two elastic arms 61 pass through the two first penetrating grooves 15 of the insulating housing 1 and the two second penetrating grooves 2128 of the upper terminal assembly 21, and then the two elastic arms 61 contact with top surfaces of the rear parts of the upper extending portions 2114 of the two outermost upper grounding terminals 213 of the upper terminal assembly 21 for improving the resonance problem generated from the grounding loop to the adjacent radio frequency (RF) signal of the high frequency electromagnetic wave in the high-frequency characteristic of the transmission signal of the electrical connector 100. In addition, the two elastic arms 61 contact with the rear parts of the upper extending portions 2114 of the two outermost upper grounding terminals 213 of the upper terminal assembly 21 to define an upper grounding point 91 for improving the insertion loss of the electrical connector 100 which is above 14 GHz.

In the preferred embodiment, the rear parts of the upper extending portions 2114 of the two outermost upper grounding terminals 213 of the upper terminal assembly 21 define a grounding area 90. In the concrete implementation, the grounding area 90 is without being limited to be defined at the rear parts of the upper extending portions 2114 of the two outermost upper grounding terminals 213 of the upper terminal assembly 21. The two protrusions 331 of the center grounding plate 3 contact with a bottom surface of the grounding area 90 to define a lower grounding point 92. The two elastic arms 61 of the outer shell 6 contact with a top surface of the grounding area 90 to define the upper grounding point 91. Furthermore, the bottom surfaces of the rear parts of the upper extending portions 2114 of the two outermost upper grounding terminals 213 of the upper terminal assembly 21 contact with the two protrusions 331 of the center grounding plate 3 to define the lower grounding point 92. The top surfaces of the rear parts of the upper extending portions 2114 of the two outermost upper grounding terminals 213 of the upper terminal assembly 21 contact with the two elastic arms 61 of the outer shell 6 to define the upper grounding point 91. The upper grounding point 91 is aligned with the lower grounding point 92 along the vertical direction. The upper grounding point 91 is opposite to the lower grounding point 92 along the vertical direction. Therefore, a shortest grounding path is formed among the two elastic arms 61 of the outer shell 6, the upper grounding point 91, the rear parts of the upper extending portions 2114 of the two outermost upper grounding terminals 213, the lower grounding point 92 and the two protrusions 331 of the center grounding plate 3.

As described above, the electrical connector 100 achieves a 40 Gbps specification by virtue of the first lacking groove 215, the second lacking groove 216, the third lacking groove 218, the fourth lacking groove 219 and the fifth lacking groove 225. Furthermore, the bottom surfaces of the rear parts of the upper extending portions 2114 of the two outermost upper grounding terminals 213 of the upper terminal assembly 21 contact with the two protrusions 331 of the center grounding plate 3, and the top surfaces of the rear parts of the upper extending portions 2114 of the two outermost upper grounding terminals 213 of the upper terminal assembly 21 contact with the two elastic arms 61 of the outer shell 6 for improving the resonance problem generated from the grounding loop to the adjacent radio frequency (RF) signal of the high frequency electromagnetic wave in the high-frequency characteristic of the transmission signal of the electrical connector 100. As a result, the electrical connector 100 improves a high-frequency signal transmission.

What is claimed is:

1. An electrical connector with high-frequency signal transmission, comprising:

an insulating housing, a rear end of the insulating housing having two first penetrating grooves vertically penetrating through the insulating housing;

an upper terminal assembly fastened in the insulating housing, the upper terminal assembly including a plurality of upper terminals and an upper base portion, the plurality of the upper terminals being fastened in the upper base portion, the plurality of the upper terminals including a plurality of upper grounding terminals and a plurality of upper signal terminals, two adjacent upper signal terminals of each side of the upper terminal assembly being disposed between two upper grounding terminals, each upper terminal having an upper fastening portion, a front end of the upper fastening portion extending frontward to form an upper contacting portion, a rear end of the upper fastening portion being bent upward to form a first upper bending portion, an upper end of the first upper bending portion extending rearward to form an upper extending portion, a rear end of the upper extending portion being bent downward to form a second upper bending portion, a lower end of the second upper bending portion extending rearward to form an upper soldering portion, a rear end of the upper base portion defining two second penetrating grooves vertically penetrating through the upper base portion, the two second penetrating grooves being aligned with the two first penetrating grooves along a vertical direction, the upper extending portions of two outermost upper grounding terminals of the plurality of the upper terminals being exposed outside to a top surface of the upper base portion through the two second penetrating grooves, the upper extending portions of the two outermost upper grounding terminals of the plurality of the upper terminals being exposed outside of the insulating housing through the two second penetrating grooves and the two first penetrating grooves;

a center grounding plate fastened in the insulating housing, the center grounding plate having a front plate, the front plate being corresponding to the upper fastening portions and the upper contacting portions of the plurality of the upper terminals, a rear end of the front plate being bent upward to form a bending plate, the bending plate being corresponding to the first upper bending portions of the plurality of the upper terminals, a rear end of the bending plate extending rearward to form a rear plate, the rear plate being corresponding to the upper extending portions of the plurality of the upper terminals of the upper terminal assembly, two opposite sides of a top surface of the rear plate protruding towards the upper grounding terminal to form two protrusions, respectively, the upper extending portions of the two outermost upper grounding terminals of the upper terminal assembly contacting with the two protrusions to define a lower grounding point; and an outer shell disposed to a top surface of the insulating housing, two opposite sides of a rear end of a top surface of the outer shell extending towards the insulating housing to form two elastic arms, respectively, the two elastic arms passing through the two first penetrating grooves and the two second penetrating grooves, and then the two elastic arms contacting with the upper extending portions of the two outermost upper grounding terminals of the upper terminal assembly to define an upper grounding point, the upper grounding point being aligned with the lower grounding point along the vertical direction.

2. The electrical connector with high-frequency signal transmission as claimed in claim 1, wherein one side of the upper fastening portion of each upper signal terminal of two sides of the upper terminal assembly is recessed inward to form a first lacking groove, a junction between one side of the first upper bending portion and one side of the upper extending portion of each upper signal terminal of the two sides of the upper terminal assembly is recessed inward to form a second lacking groove, two opposite sides of a front of a bottom surface of the upper contacting portion of each upper signal terminal of the two sides of the upper terminal assembly slantwise extend inward and downward to form two upper chamfers, a junction between one side of the upper fastening portion and one side of the upper contacting portion of each upper grounding terminal is recessed inward to form a third lacking groove, one side of the second upper bending portion of each upper grounding terminal is recessed inward to form a fourth lacking groove extending to the rear end of the upper extending portion.

3. The electrical connector with high-frequency signal transmission as claimed in claim 2, wherein a first gap is formed between the upper extending portion of the upper grounding terminal and the upper extending portion of the upper signal terminal which are adjacent to each other, a second gap is formed between an inner wall of the fourth lacking groove of the upper grounding terminal and the second upper bending portion of the upper signal terminal which are adjacent to each other, a third gap is formed between an inner wall of the third lacking groove of the upper grounding terminal and the upper contacting portion of the upper signal terminal which are adjacent to each other, a fourth gap is formed between the upper contacting portions of the two adjacent upper signal terminals of each side of the upper terminal assembly, a fifth gap is formed between two inner walls of the two first lacking grooves of the two adjacent upper signal terminals of each side of the upper terminal assembly, a sixth gap is formed between two inner walls of the two second lacking grooves of the two adjacent upper signal terminals of each side of the upper terminal assembly, the first gap is smaller than the second gap, the second gap is equal to the third gap, the third gap is equal to the fourth gap, the fourth gap is smaller than the fifth gap, the fifth gap is equal to the sixth gap.

4. The electrical connector with high-frequency signal transmission as claimed in claim 3, wherein the upper base portion has an upper base body, a front surface of the upper base body extends frontward to form an upper tongue portion, a rear end of the upper base body is bent upward to form an upper stepping portion, a top end of the upper stepping portion extends rearward to form an upper rear portion, the upper fastening portions of the plurality of the upper terminals are fastened in the upper base body, the upper fastening portions of the plurality of the upper terminals are surrounded by the upper base body, the upper contacting portions of the plurality of the upper terminals are fastened to the upper tongue portion, the upper contacting portions of the plurality of the upper terminals are partially surrounded by the upper tongue portion, the first upper bending portions of the plurality of the upper terminals are fastened in the upper stepping portion, the first upper bending portions of the plurality of the upper terminals are surrounded by the upper stepping portion, the upper extending portions and the second upper bending portions of the plurality of the upper terminals are fastened in the upper rear portion, the upper extending portions and the second upper bending portions of the plurality of the upper terminals are surrounded by the upper rear portion, the upper soldering portions of the plurality of the upper terminals are exposed out of a rear end of the upper rear portion.

5. The electrical connector with high-frequency signal transmission as claimed in claim 4, wherein the upper base portion has a plurality of upper fastening grooves, the plurality of the upper fastening grooves are formed to the upper tongue portion and the upper rear portion of the upper base portion, a bottom surface of the upper base portion is recessed upward to form an upper receiving groove, two portions of the bottom surface of the upper base portion extend downward to form the two upper protruding blocks, the upper receiving groove is located between the two upper protruding blocks, two sides of a rear of the upper rear portion of the upper base portion define the two second penetrating grooves penetrating through a top surface and a bottom surface of the upper rear portion of the upper base portion.

6. The electrical connector with high-frequency signal transmission as claimed in claim 5, wherein the terminal assembly includes a lower terminal assembly fastened in the insulating housing, the lower terminal assembly includes a plurality of lower terminals and a lower base portion, the plurality of the lower terminals are fastened to the lower base portion, each lower terminal has a lower fastening portion, a front end of the lower fastening portion extends frontward to form a lower contacting portion, a rear end of the lower fastening portion is bent upward to form a lower bending portion, a top end of the lower bending portion extends rearward to form a lower soldering portion.

7. The electrical connector with high-frequency signal transmission as claimed in claim 6, wherein the lower base portion has a lower base body, a front end of the lower base body extends frontward to form a lower tongue portion, a rear end of the lower base body is bent upward to form a lower stepping portion, a top end of the lower stepping portion extends rearward to form a lower rear portion, the lower fastening portions of the plurality of the lower terminals are fastened in the lower base body, the lower fastening portions of the plurality of the lower terminals are surrounded by the lower base body, the lower contacting portions of the plurality of the lower terminals are fastened to the lower tongue portion, the lower contacting portions of the plurality of the lower terminals are partially surrounded by the lower tongue portion, the lower bending portions of the plurality of the lower terminals are fastened in the lower stepping portion, the lower bending portions of the plurality of the lower terminals are surrounded by the lower stepping portion, the lower soldering portions of the plurality of the lower terminals are fastened to the lower rear portion, front ends of the lower soldering portions of the plurality of the lower terminals are surrounded by the lower rear portion, rear ends of the lower soldering portions of the plurality of the lower terminals are exposed out of the lower rear portion of the lower base portion.

8. The electrical connector with high-frequency signal transmission as claimed in claim 7, wherein the lower base portion has a plurality of lower fastening grooves, the plurality of the lower fastening grooves are formed to the lower base body, the lower tongue portion and the lower rear portion, two portions of a top surface of the lower base portion are recessed inward to form two lower receiving grooves, the two upper protruding blocks of the upper terminal assembly are received in the two lower receiving grooves, the top surface of the lower base portion extends upward to form a lower protruding block, the lower protruding block is disposed between the two lower receiving grooves, the lower protruding block is disposed between the two upper protruding blocks, the lower protruding block is buckled in the upper receiving groove of the upper terminal assembly.

9. The electrical connector with high-frequency signal transmission as claimed in claim 6, wherein the lower terminal assembly has a plurality of lower grounding terminals and a plurality of lower signal terminals, two adjacent lower signal terminals of each side of the lower terminal assembly are disposed between two lower grounding terminals, one side of the lower fastening portion of each lower signal terminal of two sides of the lower terminal assembly is recessed inward to form a fifth lacking groove, two opposite sides of a front of a top surface of the lower contacting portion of each lower signal terminal of the two sides of the lower terminal assembly slantwise extend inward and upward to form two lower chamfers, a clearance is formed between two facing inner walls of the two fifth lacking grooves of the two adjacent lower signal terminals of each side of the lower terminal assembly, a function of the clearance is the same as a function of the fifth gap, a structure of the clearance is the same as a structure of the fifth gap, the clearance is equal to the fifth gap.

10. The electrical connector with high-frequency signal transmission as claimed in claim 1, wherein the insulating housing has a base body, a front surface of the base body extends frontward to form a stepping portion, a front surface of the stepping portion extends frontward to form a tongue portion, a rear surface of the base body extends rearward to form a rear portion, the upper terminal assembly and the lower terminal assembly are exposed to a top surface and a bottom surface of the tongue portion, the two first penetrating grooves penetrate through a top surface and a bottom surface of two opposite sides of a middle of the rear portion of the insulating housing.

11. The electrical connector with high-frequency signal transmission as claimed in claim 10, further comprising two shielding plates, one shielding plate being disposed to a junction between an upper portion of the base body and an upper portion of the stepping portion, the other shielding plate being disposed to a junction between a lower portion of the base body and a lower portion of the stepping portion.

12. The electrical connector with high-frequency signal transmission as claimed in claim 11, wherein each shielding plate has a front fastening plate, a rear end of the front fastening plate extends opposite to the insulating housing to form a connecting plate, the connecting plate is corresponding to the front surface of the base body of the insulating housing, a rear end of the connecting plate extends rearward to form a rear fastening plate, two opposite sides of the front fastening plate extend towards the insulating housing to form a first buckling portion and a restricting portion, respectively, the first buckling portion is a T shape, the restricting portion is a U shape, the first buckling portions and the restricting portions of the two shielding plates are buckled with each other to fasten the two shielding plates, two opposite sides of the rear fastening plate extend towards the insulating housing to form two second buckling portions.

13. The electrical connector with high-frequency signal transmission as claimed in claim 12, wherein middles of a top surface and a bottom surface of the base body are recessed inward to form two first concave surfaces, respectively, the two first concave surfaces extend to the front surface of the base body, the two rear fastening plates of the two shielding plates are corresponding to the two first concave surfaces of the base body of the insulating housing, two opposite sides of each first concave surface are recessed inward to form two first location holes, the second buckling portions of the two shielding plates are disposed in the two first location holes of the base body of the insulating housing.

14. The electrical connector with high-frequency signal transmission as claimed in claim 13, wherein two middles of a top surface and a bottom surface of the stepping portion are recessed inward to form two second concave surfaces, respectively, the two front fastening plates of the two shielding plates are corresponding to the two second concave surfaces of the stepping portion of the insulating housing, two opposite sides of each second concave surface are recessed inward to form two second location holes, respectively, the first buckling portion and the restricting portions are disposed in the two second location holes of the stepping portion of the insulating housing.

15. The electrical connector with high-frequency signal transmission as claimed in claim 14, wherein the front plate has a third location hole penetrating through a top surface and a bottom surface of the front plate, the two upper protruding blocks of the upper terminal assembly are fastened in the third location hole of the front plate, the lower protruding block of the lower terminal assembly is fastened in the third location hole of the front plate.

16. The electrical connector with high-frequency signal transmission as claimed in claim 15, further comprising an inner shell disposed to a front end of the insulating housing, and the insulating housing is partially surrounded by the inner shell, the outer shell being disposed to top surfaces of the insulating housing and the inner shell.

17. The electrical connector with high-frequency signal transmission as claimed in claim 16, wherein an upper portion and a lower portion of the inner shell protrude towards the insulating housing to form a convex block, front ends of the top surface and the bottom surface of the base body are recessed inward to form a positioning hole, the convex block is buckled with the positioning hole of the base body of insulating housing, a quantity of the convex block of the inner shell is the same as a quantity of the positioning hole of the base body of insulating housing.

18. The electrical connector with high-frequency signal transmission as claimed in claim 1, wherein the rear parts of the upper extending portions of the two outermost upper grounding terminals of the upper terminal assembly define a grounding area, the two protrusions of the center grounding plate contact with a bottom surface of the grounding area to define the lower grounding point, the two elastic arms of the outer shell contact with a top surface of the grounding area to define the upper grounding point.

19. An electrical connector with high-frequency signal transmission, comprising:

an insulating housing, a rear end of the insulating housing having two first penetrating grooves vertically penetrating through the insulating housing;

an upper terminal assembly fastened in the insulating housing, the upper terminal assembly including a plurality of upper terminals and an upper base portion, the plurality of the upper terminals being fastened in the upper base portion, the plurality of the upper terminals including a plurality of upper grounding terminals and a plurality of upper signal terminals, two adjacent upper signal terminals of each side of the upper terminal assembly being disposed between two upper grounding terminals, each upper terminal having an upper fastening portion, a front end of the upper fastening portion extending frontward to form an upper contacting portion, a rear end of the upper fastening portion being bent upward to form a first upper bending portion, an upper end of the first upper bending portion extending rearward to form an upper extending portion, a rear end of the upper extending portion being bent downward to form a second upper bending portion, a lower end of the second upper bending portion extending rearward to form an upper soldering portion, a rear end of the upper base portion defining two second penetrating grooves vertically penetrating through the upper base portion, the two second penetrating grooves being aligned with the two first penetrating grooves along a vertical direction, the upper extending portions of two outermost upper grounding terminals of the plurality of the upper terminals being exposed outside to a top surface of the upper base portion through the two second penetrating grooves, the upper extending portions of the two outermost upper grounding terminals of the plurality of the upper terminals being exposed outside of the insulating housing through the two second penetrating grooves and the two first penetrating grooves, one side of the upper fastening portion of each upper signal terminal of two sides of the upper terminal assembly being recessed inward to form a first lacking groove, a junction between one side of the first upper bending portion and one side of the upper extending portion of each upper signal terminal of the two sides of the upper terminal assembly being recessed inward to form a second lacking groove, a junction between one side of the upper fastening portion and one side of the upper contacting portion of each upper grounding terminal being recessed inward to form a third lacking groove, one side of the second upper bending portion of each upper grounding terminal being recessed inward to form a fourth lacking groove extending to the rear end of the upper extending portion;

a center grounding plate fastened in the insulating housing, the center grounding plate having a front plate, the front plate being corresponding to the upper fastening portions and the upper contacting portions of the plurality of the upper terminals, a rear end of the front plate being bent upward to form a bending plate, the bending plate being corresponding to the first upper bending portions of the plurality of the upper terminals, a rear end of the bending plate extending rearward to form a rear plate, the rear plate being corresponding to the upper extending portions of the plurality of the upper terminals of the upper terminal assembly, two opposite sides of a top surface of the rear plate protruding towards the upper grounding terminal to form two protrusions, respectively, the upper extending portions of the two outermost upper grounding terminals of the upper terminal assembly contacting with the two protrusions to define a lower grounding point;

a lower terminal assembly fastened in the insulating housing, the center grounding plate being disposed between the upper terminal assembly and the lower terminal assembly, the lower terminal assembly including a plurality of lower terminals, the plurality of the lower terminals including a plurality of lower signal terminals, each lower terminal having a lower fastening portion, one side of the lower fastening portion of each lower signal terminal of two sides of the lower terminal assembly being recessed inward to form a fifth lacking groove; and an outer shell disposed to a top surface of the insulating housing, two opposite sides of a rear end of a top surface of the outer shell extending towards the insulating housing to form two elastic arms, respectively, the two elastic arms passing through the two first penetrating grooves and the two second penetrating grooves, and then the two elastic arms contacting with the upper extending portions of the two outermost upper grounding terminals of the upper terminal assembly to define an upper grounding point, the upper grounding point being aligned with the lower grounding point along the vertical direction.

20. An electrical connector with high-frequency signal transmission, comprising:

an insulating housing, a rear end of the insulating housing having two first penetrating grooves vertically penetrating through the insulating housing;

an upper terminal assembly fastened in the insulating housing, the upper terminal assembly including a plurality of upper terminals and an upper base portion, the plurality of the upper terminals being fastened in the upper base portion, the plurality of the upper terminals including a plurality of upper grounding terminals and a plurality of upper signal terminals, two adjacent upper signal terminals of each side of the upper terminal assembly being disposed between two upper grounding terminals, each upper terminal having an upper fastening portion, a front end of the upper fastening portion extending frontward to form an upper contacting portion, a rear end of the upper fastening portion being bent upward to form a first upper bending portion, an upper end of the first upper bending portion extending rearward to form an upper extending portion, a rear end of the upper extending portion being bent downward to form a second upper bending portion, a lower end of the second upper bending portion extending rearward to form an upper soldering portion, a rear end of the upper base portion defining two second penetrating grooves vertically penetrating through the upper base portion, the two second penetrating grooves being aligned with the two first penetrating grooves along a vertical direction, the upper extending portions of two outermost upper grounding terminals of the plurality of the upper terminals being exposed outside to a top surface of the upper base portion through the two second penetrating grooves, the upper extending portions of the two outermost upper grounding terminals of the plurality of the upper terminals being exposed outside of the insulating housing through the two second penetrating grooves and the two first penetrating grooves, one side of the upper fastening portion of each upper signal terminal of two sides of the upper terminal assembly being recessed inward to form a first lacking groove, a junction between one side of the first upper bending portion and one side of the upper extending portion of each upper signal terminal of the two sides of the upper terminal assembly being recessed inward to form a second lacking groove, a junction between one side of the upper fastening portion and one side of the upper contacting portion of each upper grounding terminal being recessed inward to form a third lacking groove, one side of the second upper bending portion of each upper grounding terminal being recessed inward to form a fourth lacking groove extending to the rear end of the upper extending portion;

a center grounding plate fastened in the insulating housing, the center grounding plate having a front plate, the front plate being corresponding to the upper fastening portion and the upper contacting portion of each upper terminal, a rear end of the front plate being bent upward to form a bending plate, the bending plate being corresponding to the first upper bending portions of the plurality of the upper terminals, a rear end of the bending plate extending rearward to form a rear plate, the rear plate being corresponding to the upper extending portions of the upper terminal assembly, two opposite sides of a top surface of the rear plate protruding towards the upper grounding terminal to form two protrusions, respectively, bottom surfaces of the rear parts of the upper extending portions of the two outermost upper grounding terminals of the upper terminal assembly contacting with the two protrusions to define a lower grounding point;

a lower terminal assembly fastened in the insulating housing, the center grounding plate being disposed between the upper terminal assembly and the lower terminal assembly, the lower terminal assembly including a plurality of lower terminals, the plurality of the lower terminals including a plurality of lower signal terminals, each lower terminal having a lower fastening portion, one side of the lower fastening portion of each lower signal terminal of two sides of the lower terminal assembly being recessed inward to form a fifth lacking groove; and an outer shell disposed to a top surface of the insulating housing, two opposite sides of a rear end of a top surface of the outer shell extending towards the insulating housing to form two elastic arms, respectively, the two elastic arms passing through the two first penetrating grooves and the two second penetrating grooves, and top surfaces of the rear parts of the upper extending portions of the two outermost upper grounding terminals of the upper terminal assembly contacting with the two elastic arms to define an upper grounding point, the upper grounding point being aligned with the lower grounding point along the vertical direction.

* * * * *